UNITED STATES PATENT OFFICE.

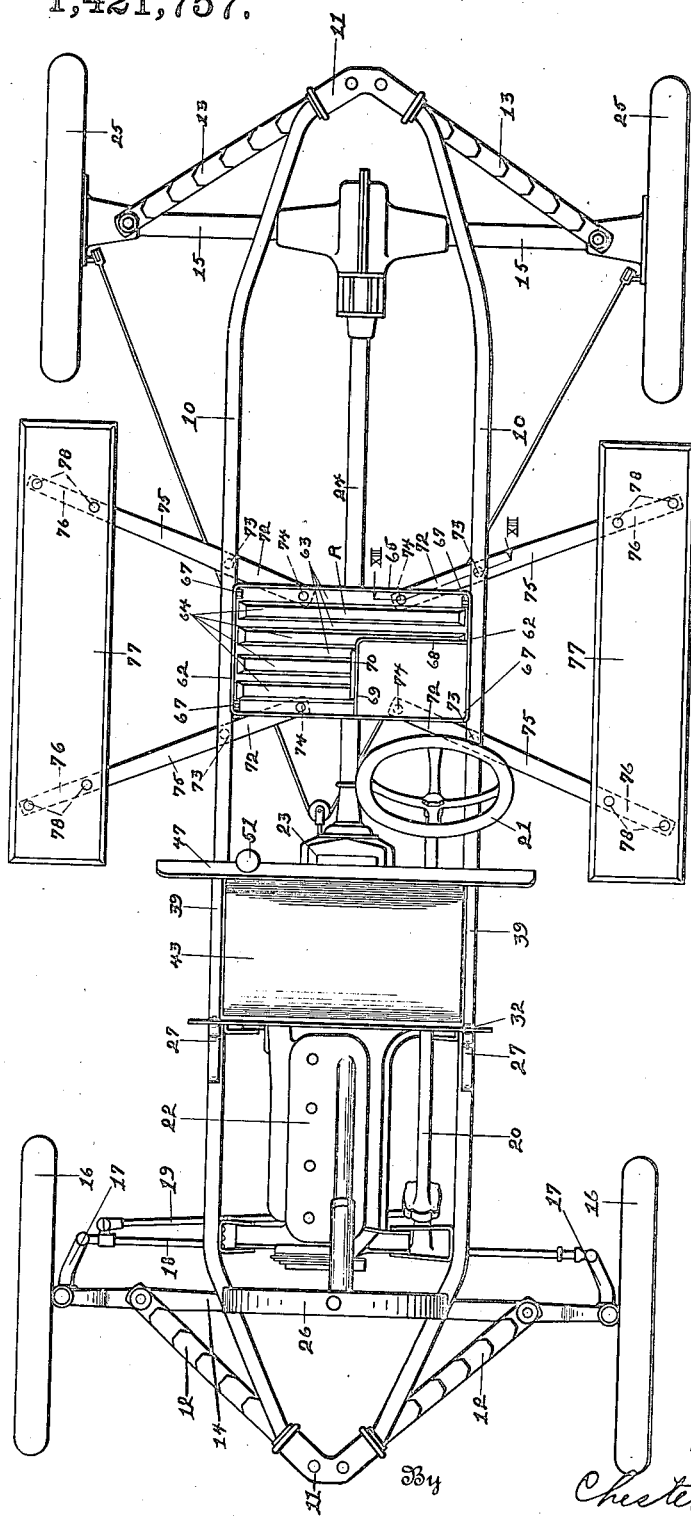

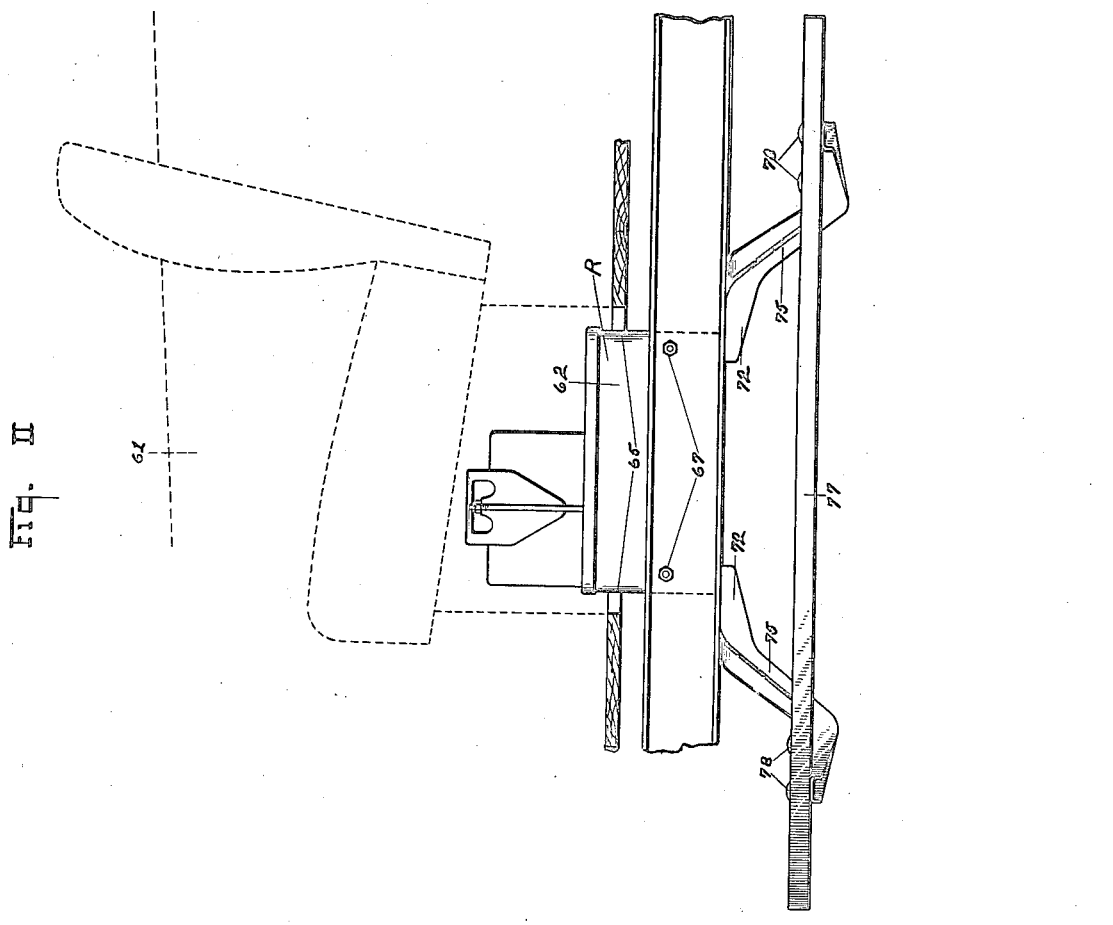

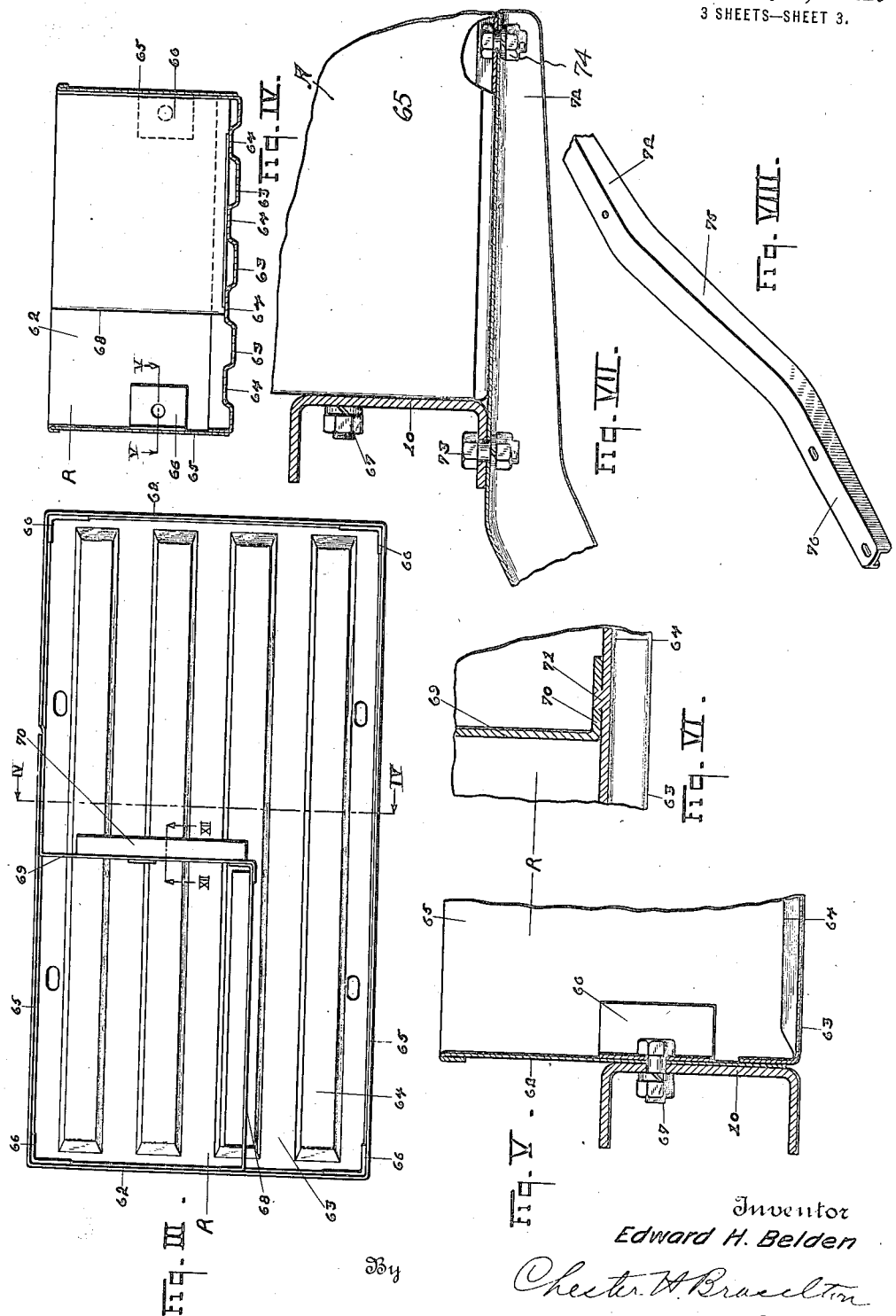

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

MOTOR VEHICLE.

1,421,757.     Specification of Letters Patent.     Patented July 4, 1922.

Application filed September 12, 1917. Serial No. 190,966.

*To all whom it may concern:*

Be it known that I, EDWARD H. BELDEN, a citizen of the United States, residing at Toledo, in the county of Lucas and State of Ohio, have invented certain new and useful Improvements in Motor Vehicles, of which I declare the following to be a full, clear, and exact description.

This invention relates to improvements in motor vehicles and particularly to the construction of the chassis of the motor vehicle.

An object of my invention is to provide a receptacle which may conveniently serve as a tool box and a battery holder, said receptacle being so constructed and arranged as to act as a brace for the central part of the vehicle frame. Another object of my invention is to provide an improved construction for supporting the running boards from the frame.

Further objects of this invention relate to economies of manufacture and details of construction as will hereinafter appear from the detailed description to follow. I accomplish the objects of my invention in one instance by the devices and means described in the following specifications, but it is evident that the same may be varied widely without departing from the scope of the invention as pointed out in the appended claims. A structure constituting one embodiment of my invention, which may be preferred, is illustrated in the accompanying drawings forming a part hereof in which:

Figure I is a top plan view of a motor vehicle chassis embodying my invention.

Figure II is a fragmentary view, in side elevation, of a motor vehicle chassis embodying my invention.

Figure III is a top plan view of a receptacle forming a brace between the side bars of the frame.

Figure IV is a detail, sectional view, taken substantially on the line IV—IV of Figure III.

Figure V is an enlarged, fragmentary, sectional view, taken on line V—V of Figure IV.

Figure VI is a fragmentary, detail, sectional view, taken on the line VI—VI of Figure III.

Figure VII is an enlarged fragmentary, sectional view, taken on the line VII—VII of Figure I.

Considering the numbered parts of the drawing, I have shown the chassis of a motor vehicle comprising a frame made up of longitudinally extending bars 10 which are connected at their ends by the plates 11, said frame being supported at the front end, from the front axle 14, by the springs 12 and, at the rear end, from the rear axle 15, by the springs 13. The front steering wheels 16 are carried by the front axle in the usual manner and the steering arms 17 are connected by the rod 18, and operated through the rod 19 connected with the steering column 20, having the steering wheel 21. An engine 22 is mounted on the forward part of the frame and is connected with the rear axle through the clutch and transmission housed in the casing 23 and the propeller shaft housed within the tube 24 in the usual manner. The rear driving wheels 25 are mounted on the rear axle 15 in the usual manner. The radiator 26 is supported on the frame in any suitable manner in front of the engine.

One means for carrying this invention into effect includes a receptacle R having the end walls 62 and side walls 65, the bottom 63 thereof being provided with longitudinally extending corrugations 64, which serve to stiffen the receptacle to permit the same to act as a brace for the vehicle frame, said receptacle being disposed between the longitudinally extending side bars 10 and secured thereto by the bolts 67 (see Figure V) passing through said end walls 62 and through reinforcing angles 66 provided adjacent said end walls.

A strap 70 may be provided to extend transversely of the bottom 63 of the receptacle and is spot welded at 71 to the corrugations 64 while a plate 69 is secured to the walls of said receptacle and said strap 70 and form a partition, which with a plate 68 secured in the receptacle, forms a compartment within which the batteries may be supported.

Arms are provided for supporting the running boards, each of said arms comprising a horizontal portion 72, having a bolt 74 passing through the inner end thereof and connecting it to the bottom of the receptacle, and a bolt 73 connecting the horizontal portion 72 to one flange of the channel-shaped side bar 10. Each of said arms has an intermediate downwardly inclined portion 75 and an outer horizontal portion 76, to which the running board 77 may be fastened by bolts 78. A pair of these arms is provided at each side of the frame, said arms diverging outwardly, as shown in Figure I, and supporting the running board.

The receptacle R having the end walls 62, side walls 65 and bottom 63 is so arranged that it serves the double function of a tool box and a battery holder and also serves to take the place of the usual brace extending between the side bars of the frame at this point. The corrugations 64 are provided in the bottom of this receptacle to stiffen it and make a compression member, so as to enable it to brace the frame the same preferably located within or adjacent the horizontal zone passing through the side frame bars. The receptacle also serves to assist in the supporting of the inner ends of the arms for carrying the running boards, said running boards being secured to the inwardly diverging arms as shown in Figure I.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new, and desire to secure by Letters Patent is:

1. In a motor vehicle, the combination of a frame comprising a pair of longitudinally extending side bars; and a rigid box-like receptacle secured at its ends to said side bars intermediate the ends thereof, and forming a brace for the middle part of said frame.

2. In a motor vehicle, the combination of a vehicle frame comprising a pair of longitudinally extending side bars; and a rigid box-like receptacle disposed between and secured at its ends to said side bars, the bottom of said receptacle being provided with longitudinally extending corrugations whereby said receptacle serves as a bracing member connecting the central portions of said side bars.

3. In a motor vehicle, the combination of a vehicle frame comprising a pair of longitudinally extending side bars; a receptacle disposed between said side bars and forming a bracing member connecting their central portions, brace members connected at their inner ends to said side bars and the bottom of said receptacle; and a running board carried by the outer ends of said braces.

4. In a motor vehicle, the combination of a frame having a pair of longitudinally extending side bars, means for connecting said side bars at their ends and a rigid box-like receptacle connecting said side bars at an intermediate point, the bottom of said receptacle being in substantially the plane of said side bars thereby forming a stiffening brace therefor.

5. In a motor vehicle, the combination of a vehicle frame having a pair of longitudinally extending side bars and a box-like receptacle having side and end walls said end walls abutting the faces of said side bars, said receptacle extending between said side bars and secured thereto to form a brace for said frame.

6. In a motor vehicle, the combination of a vehicle frame having a pair of longitudinally extending side bars, a box-like receptacle having side and end walls and a corrugated base, the end walls abutting the faces of the side bars and the base lying substantially flush with the lower edge of the side bars, said receptacle extending between said side bars and secured thereto to form a brace for said frame.

7. In a motor vehicle, the combination of a vehicle frame having a pair of longitudinally extending side bars, a receptacle secured to said side bars intermediate the ends thereof, and arms secured to the receptacle and extending outwardly from either side of the same for supporting a running board.

8. In a motor vehicle, a vehicle frame having a pair of longitudinally extending side bars, a receptacle positioned intermediate the side bars and secured thereto, and a pair of arms secured to the receptacle and side bars upon each side of the frame, the said arms upon each side of the frame diverging outwardly and supporting a running board at their outer ends.

9. In a motor vehicle, a vehicle frame having a pair of longitudinally extending side bars a corrugated member lying substantially flush with the lower edges of the side bars, connecting and acting as a brace for the said side bars, a pair of arms secured to the frame and to said side bars and diverging outwardly therefrom upon opposite sides thereof, and a running board supported by the arms upon either side of the vehicle frame.

10. In a motor vehicle, a vehicle frame having a pair of longitudinally extending side bars, a box-like receptacle positioned between the side bars and serving as a brace therefor, and a pair of arms secured to the receptacle and to the side bar upon either side of the frame and diverging outwardly therefrom, said arms being adapted to support a running board at the side of the vehicle frame.

11. In a motor vehicle, a vehicle frame having a pair of longitudinally extending side bars, a receptacle having a corrugated base member, connecting and acting as a brace for the said side bars, and a pair of arms secured to the corrugated member and to the side bars upon either side of the frame and extending outwardly therefrom, the said arms being adapted to support a running board.

In testimony whereof I affix my signature.

EDWARD H. BELDEN.